United States Patent [19]

Mullen

[11] Patent Number: 5,744,242
[45] Date of Patent: Apr. 28, 1998

[54] PROTECTIVE LINER ARTICLE AND METHOD OF MAKING IT

[75] Inventor: Henry A. Mullen, Jefferson County, Ky.

[73] Assignee: Imrie-Gielow, Inc., St. Louis, Mo.

[21] Appl. No.: 637,150

[22] Filed: Apr. 24, 1996

[51] Int. Cl.$^6$ ................................................. B32B 17/06
[52] U.S. Cl. .................. 428/427; 428/426; 428/428; 65/22
[58] Field of Search ......................... 428/426, 427, 428/428; 65/22

[56] References Cited

U.S. PATENT DOCUMENTS

| | | | |
|---|---|---|---|
| 2,931,142 | 4/1960 | Veres | 428/427 X |
| 3,564,587 | 2/1971 | Ellis | 428/427 |
| 4,119,422 | 10/1978 | Rostoker | 428/428 X |
| 4,198,224 | 4/1980 | Kirkpatrick | 65/22 |
| 4,381,333 | 4/1983 | Stewart et al. | 428/427 X |

*Primary Examiner*—Daniel Zirker
*Attorney, Agent, or Firm*—Polster, Lieder, Woodruff & Lucchesi, L.C.

[57] ABSTRACT

A protective liner article for wet scrubbers and the like consists of a cellulated glass block of corrosion-resistant material, such as PENNGUARD® Block, a cellulated borosilicate glass, and a sheet of glassy, corrosion-resistant material which can be and preferably is corrosion-resistant glass such as 7740 Pyrex® bonded to a face of the block. The sheet is fused to the cellulated borosilicate glass block by applying radiant heat to an outer surface of the sheet while keeping the body of the block at a temperature below the degradation temperature of the block until the sheet bonds to the face of the block. Preferably, a finely-divided frit is applied to the surface to which the glass is bonded, filling interstices of the surface of the block, before the sheet is placed on the block.

16 Claims, 2 Drawing Sheets

PROTECTIVE LINER ARTICLE AND METHOD OF MAKING IT

BACKGROUND OF THE INVENTION

In installations such as wet scrubbers of coal burning utilities, in which walls of scrubber or ducts, any of carbon steel or COR-TEN® steel, would be subjected to a corrosive atmosphere and to changes in temperature that expose the walls to substantial thermal shock, it has been common heretofore to use one of two types of liners to protect the walls of the scrubber or duct: the "wallpaper" type, in which sheets of titanium, Hastelloy® or Inconel®, are secured to the walls of the duct, or, alternatively, an insulative type, in which blocks of cellulated material, such as borosilicate glass, are mounted on the metal walls generally by a membrane of urethane asphalt applied around the back and sides of the borosilicate block. It is to the latter type that this invention relates. Other lining materials have been tried, such as acid-proof gunite, epoxy resin, vinyl ester, and the like, but they are not as satisfactory.

Although the foamed or cellulated block provides superior insulating properties, it has several disadvantages. Its rough, pitted surface retains dust and any other particulate matter to which it is exposed, and it is in some respects fragile, as, for example, when workmen are cleaning a scrubber and jab a hook of welding rod into the block to serve as a hanger for a light.

One of the objects of this invention is to provide an improved block type liner article, and a method of manufacturing it.

Other objects will become apparent to those skilled in the art in the light of the following description and accompanying drawing.

SUMMARY OF THE INVENTION

In accordance with this invention, generally stated, a protective liner article for wet scrubbers and the like is provided that comprises a cellulated block of corrosion-resistant material and a sheet of glassy, corrosion-resistant material bonded to an exposed face of the block. The sheet and block have coefficients of expansion sufficiently compatible, for a block of a particular size, to permit the sheet and block to maintain their bond through the range of temperatures to which they are subjected.

Preferably, the block is a cellulated or foamed borosilicate glass of the character of PENNGUARD® Block and the sheet is a borosilicate glass of the character of 7740 Pyrex® glass. The glass sheet is fused to a face of the block by subjecting the sheet to a temperature at which the sheet bonds to the face of the block, while keeping the body of the block at a temperature below its degradation temperature, i.e. a temperature below which the block loses its dimensional stability. Preferably, the surface of the cellulated block to which the sheet is to be bonded is first covered with frit, to fill the pores, pits or interstices in the face of the brick to which the sheet is to be fused, and the excess struck off, before the sheet is fused to the block. The frit can be of the same material as the block itself, but need not be.

When a block such as PENNGUARD® Block, a product of Pennwalt (now Elf Atochem North America, Inc.), as described in a technical data specification CE-215, is used, with a coefficient of linear thermal expansion of $2.8 \times 10^{-6}/$in/in/° C., a sheet of Corning 7740 PYREX® borosilicate glass can be fused to a surface of a standard sized, 9"×6"(229 mm×152 mm), block by heating the sheet above its softening point (in the case of 7740 PYREX® glass, 821° C.), for example, to about 921° C. (1,690° F.) by a radiant heater, while keeping the body of the block below the 515.5° C. (960° F.) temperature at which the block begins to lose its dimensional stability.

When a block such as PENNGUARD® 55 Block is used, which has a higher coefficient of thermal expansion ($55 \times 10^{-7}$ in/in/°C.), using Pyrex® 7740 glass sheet, it is desirable that the block and sheet be square in plan with sides on the order of 6" long.

IN THE DRAWING

In the drawing

DESCRIPTION OF THE PREFERRED EMBODIMENT

Figure 1:
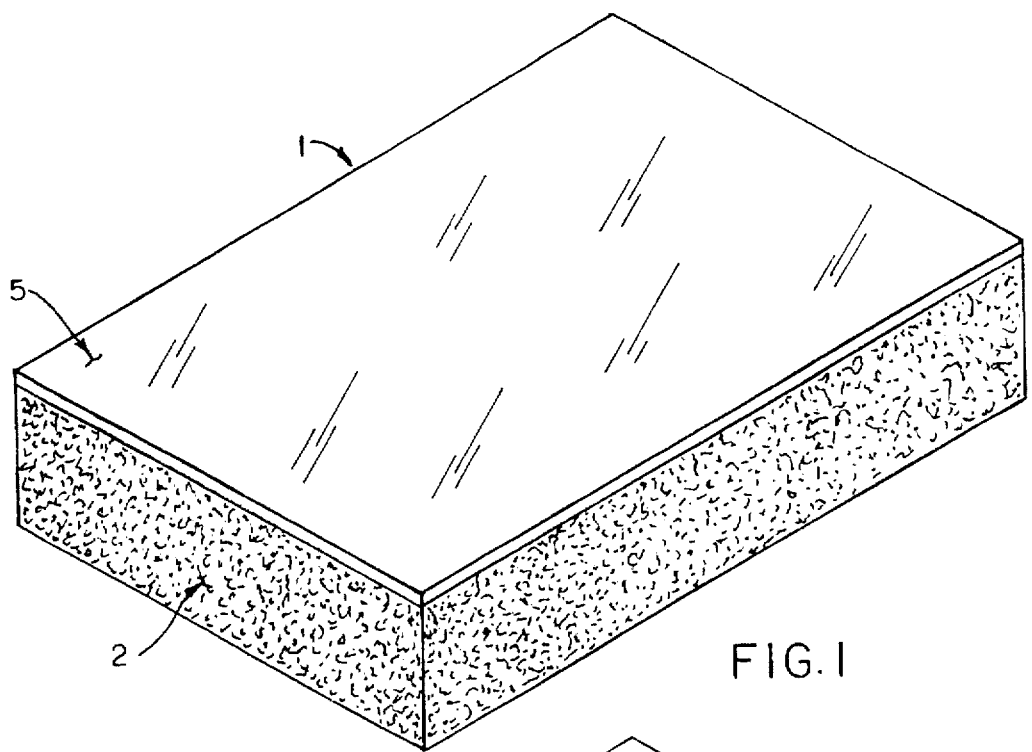
FIG. 1 is a view in perspective of an embodiment of liner article of this invention.
Figure 2:
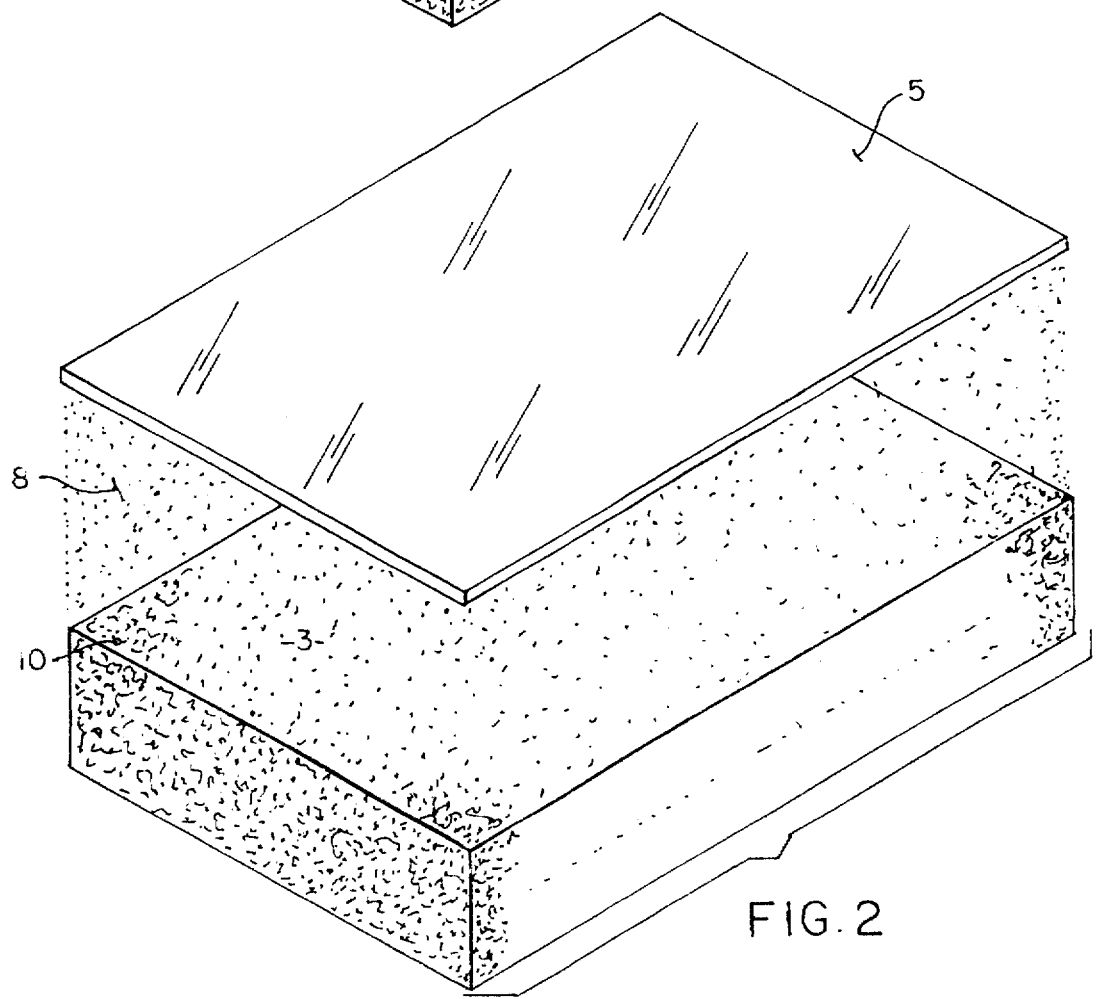
FIG. 2 is an exploded view of a block and sheet, with finely divided frit being applied to the block preparatory to the fusion of the sheet and block.
Figure 3:
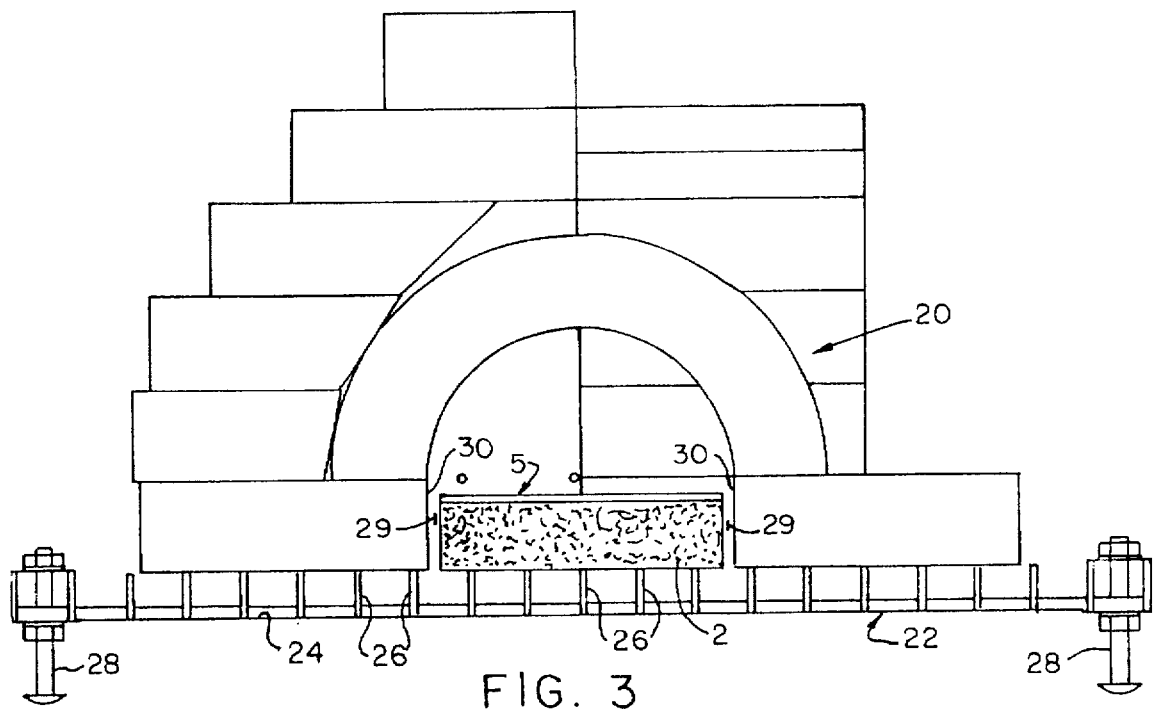
FIG. 3 is a somewhat schematic view of a furnace in which the sheet is being fused to the block.
Figure 4:
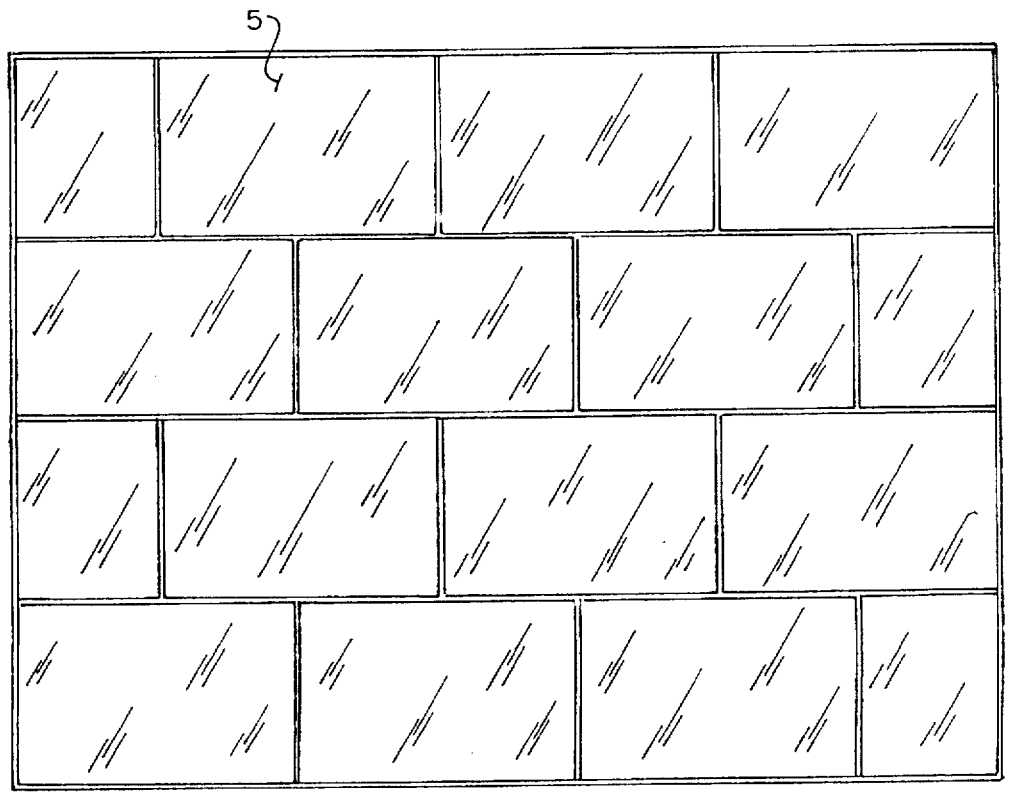
FIG. 4 is a view in elevation showing the liner articles of this invention applied to a wall of a wet scrubber.

Referring now to FIGS. 1 and 2 for one embodiment of liner article of this invention, reference numeral 1 indicates the completed article. The article 1 consists of a cellulated block 2, preferably of a borosilicate glass, such a PENNGUARD® Block as described in Pennwalt data specification CE215, on one face 3 of which a sheet 5 of borosilicate glass such as Corning 7740 Pyrex® is fused. In this preferred embodiment, a layer of finely divided frit 8 fills interstices 10 in the face 3 before the sheet 5 is fused to the face 3.

In producing the article 1, a block of cellulated borosilicate glass is covered on one face with fine frit, in the illustrative example, -10 mesh, Tyler screen, which can be of the same composition as the block, to fill the interstices or pits in the block face to which the sheet is to be fused. The excess frit is struck off with a straight edged utensil, and the sheet 5 put into position. The block with the sheet in position is then put into an oven 20. The oven 20 has a grate 22 with cross bars 24 and upright rails 26 on the tops of which the block rests. The cross bars 24 are spaced from one another, as are the rails 26, so as to leave passages for the admission of ambient air. The cross bars 24 are supported on feet 28, to permit the influx of air. Side walls 30 are spaced from the block 2 to leave passages 29, again, to permit the circulation of air between the side walls 30 and facing walls of the block. In this illustrative embodiment, an arched top wall extends over the top of the block and sheet, and contains electric resistance elements which radiate heat onto the sheet 5. It is desirable to raise the temperature of the sheet as quickly as possible, consistent with the integrity of the sheet, so as to expose the block to as little heating time as possible.

In the somewhat schematically shown oven 20, a back wall is provided, so that only one article at a time is made. However, the oven can take the form of a tunnel oven or lehr, with the blocks being conveyed through a length of the oven, and the configuration of the heating element portion of the oven can be varied to suit the oven and the desired result. The arched or domed type oven gives a more concentrated heat then a flat span, but the flat span can be used.

The sheet 5 is heated to about 921° C., at which time it is sufficiently soft to fuse to the block, the body of which is maintained below about 515° C., by virtue of the circulation of air around it.

When PENNGUARD® Block, with a coefficient of linear thermal expansion of $(2.8\times10^{-6})/°C$. is used, the block and sheet can be of the standard 9"×6"(229mm×152mm) size. If the block is PENNGUARD® 55 Block, with a coefficient of linear expansion of $55\times10^{-7}$ in/in/°C., the block size should not exceed 6"×6"(1 52mm ×152mm). The thickness of the block is determined by the use to which it is to be put. In a "cold" zone, a thickness of 1 ½" is sufficient; in a "hot" zone, a thickness of 2" is desirable; the thickness of the block is of no consequence with respect to the present invention.

Numerous variations in the construction and method of making the article of this invention within the scope of the appended claims will occur to those skilled in the art in the light of the foregoing disclosure. The combination of PENNGUARD "28" or "55" blocks PENNGUARD "28" frit and 7740 (Coming) Pyrex glass has been found particularly desirable. A combination of PENNGUARD 55 block, PENNGUARD 55 frit and either 7058 or 7059 Pyrex glass, fused under the conditions described, has been found unsatisfactory. However, in the light of the foregoing disclosure, by comparing the known characteristics of block, flit and glass, one skilled in the art can determine what combination is likely to be satisfactory for the application at hand.

As has been indicated, tunnel furnaces or lehrs can be used to make the fusion process continuous, and radiant heating units with a flat span can be used above the sheets to be fused to the block. The blocks have utility in any environment in which a structure must be protected against erosive or corrosive atmospheres and sharp temperature gradients. These variations are merely illustrative.

What is claimed is:

1. A protective liner article comprising a cellulated block of borosilicate glass and a sheet of glassy, material bonded to a broad face of said block, said sheet and said block having coefficients of expansion sufficiently compatible to permit the sheet and block to maintain their bond through the range of temperature to which they are subjected, said block having a degradation temperature lower than the fusing temperature of said glassy sheet material, said sheet being exposed to a corrosive atmosphere whereby the cellulated block and a surface on which said block is mounted are protected by said sheet.

2. The liner article of claim 1 wherein both said block and said sheet are borosilicate glass.

3. The liner article of claim 2 wherein said sheet is fused to a surface of said block.

4. The liner article of claim 3 wherein interstices in the face of the block to which the sheet is to be fused are filled with a finely divided frit.

5. The liner article of claim 4 wherein said frit is the same material as said block.

6. The liner article of claim 5 wherein the frit fills substantially all of the interstices opening through said face.

7. The liner article of claim 3 wherein the block has a coefficient of linear expansion of about $2.8\times10^{-6}$ in/in/°C. and a maximum service temperature of about 516–° C. (unloaded), and the dimensions of the face of the block and of the sheet are no greater than on the order of 6"×6".

8. The liner article of claim 3 wherein the block has a coefficient of linear expansion of about $2.8\times10^{-8}$ in/in/°C., and a maximum service temperature of about 517° C. (unloaded), the frit has the characteristics of said block, and the glass sheet has a softening point of about 821° C., a working point of about 1252° C. and a coefficient of expansion of about $35\times10^{-7}$ in/in/in/°C. between 25° C. and 515–° C.

9. A method of making a hard and smooth-faced cellulated block protective liner comprising covering a face of a cellulated borosilicated glass block with a sheet of corrosion-resistant glass having a fusing temperature higher than the degradation temperature of said block and applying heat to an outer surface of said sheet while keeping the body of said block at a temperature below its degradation temperature until said sheet bonds to said face.

10. The method of claim 9 including the step of applying to said face, before said sheet is put into place, a fine frit of material with a softening point lower than the softening point of said sheet, said frit being sufficiently fine to fill interstices of said cellulated block face.

11. The method of claim 10 wherein said frit has the same composition as the said block.

12. The method of claim 9 wherein said block and said sheet are made of borosilicate glass.

13. The method of claim 12 wherein the heat applied to said sheet is radiant heat, the cellulated block has coefficient of linear expansion of about $2.8\times10^{-8}$ in/in/°C., and a maximum service temperature of about 5172° C. (unloaded), the sheet has a softening point of about 821° C., a working point of about 12522° C. and a coefficient of expansion of about $35\times10^{-7}$ in/in/°C. between 25° C. and 515° C., and the temperature to which the sheet is raised is on the order of 900° C.

14. The method of claim 12 wherein the cellulated block will resist temperatures up to the order of 500° C. and the temperature to which the sheet is raised is on the order of 900° C.

15. The method of claim 13 wherein the heat applied to said sheet is radiant heat, the cellulated block has a coefficient of linear expansion of about $2.8\times10^{-8}$ in/in/°C., and a maximum service temperature of about 517° C. (unloaded), the sheet has a softening point of about 821° C., a working point of about 1252° C. and a coefficient of expansion of about $35\times10^{-7}$ in/in/°C. between 25° C. and 515° C., the temperature to which the sheet is raised is on the order of 900° C., and the block face is square and on the order of 6" on a side.

16. The method of claim 10 wherein the heat applied to said sheet is radiant heat, the frit has the characteristics of said cellulated block, the cellulated block has a coefficient of linear expansion of about $2.8\times10^{-8}$ in/in°C., and a maximum service temperature of about 517° C. (unloaded), the sheet has a softening point of about 821° C., a working point of about 1252° C. and a coefficient of expansion of about $35\times10^{-7}$ in/in/°C. between 25° C. and 515° C., and the temperature to which the sheet is raised is on the order of 900° C.

* * * * *

UNITED STATES PATENT AND TRADEMARK OFFICE
CERTIFICATE OF CORRECTION

PATENT NO : 5,744,242

DATED : April 28, 1998

INVENTOR(S) : Henry A. Mullen

It is certified that error appears in the above-identified patent and that said Letters Patent is hereby corrected as shown below:

Col. 3, line 23
 replace "flit"
 with --frit--.
IN THE CLAIMS:

Col. 4, line 29
 replace "5172°C"
 with --517°-C--.
Col. 4, line 31
 replace "12522°C"
 with --1252°-C--.

Signed and Sealed this

Twenty-eighth Day of July, 1998

Attest:

BRUCE LEHMAN

*Attesting Officer*   *Commissioner of Patents and Trademarks*